(12) United States Patent
Weiss et al.

(10) Patent No.: US 10,620,107 B2
(45) Date of Patent: Apr. 14, 2020

(54) DETERMINING FLUID RESERVOIR CONNECTIVITY USING NANOWIRE PROBES

(71) Applicant: The Regents of the University of California, Oakland, CA (US)

(72) Inventors: Paul S. Weiss, Los Angeles, CA (US); Anne M. Andrews, Los Angeles, CA (US); Andrea L. Bertozzi, Santa Monica, CA (US); Stanley J. Osher, Pacific Palisades, CA (US)

(73) Assignee: The Regents of the University of California, Oakland, CA (US)

( * ) Notice: Subject to any disclaimer, the term of this patent is extended or adjusted under 35 U.S.C. 154(b) by 275 days.

(21) Appl. No.: 15/308,049

(22) PCT Filed: May 5, 2015

(86) PCT No.: PCT/US2015/029173
§ 371 (c)(1),
(2) Date: Oct. 31, 2016

(87) PCT Pub. No.: WO2015/171561
PCT Pub. Date: Nov. 12, 2015

(65) Prior Publication Data
US 2017/0052104 A1     Feb. 23, 2017

Related U.S. Application Data

(60) Provisional application No. 61/988,808, filed on May 5, 2014.

(51) Int. Cl.
*G01M 3/22*     (2006.01)
*E21B 47/10*    (2012.01)
(Continued)

(52) U.S. Cl.
CPC ..... *G01N 15/0806* (2013.01); *E21B 47/1015* (2013.01); *G01M 3/226* (2013.01);
(Continued)

(58) Field of Classification Search
CPC .... E21B 47/1015; G01M 3/226; G01N 15/06; G01N 15/08; G01N 15/0806;
(Continued)

(56) References Cited

U.S. PATENT DOCUMENTS

| 507,771 A    | 10/1893 | James et al.  |
| 3,993,131 A  | 11/1976 | Riedel et al. |

(Continued)

FOREIGN PATENT DOCUMENTS

| WO | 2007102023 A1 | 9/2007 |
| WO | 2011084656 A1 | 7/2011 |

(Continued)

OTHER PUBLICATIONS

International Preliminary Report on Patentability for International Application PCT/US2015/029173, Report dated Nov. 8, 2016, dated Nov. 17, 2016, 9 Pgs.

(Continued)

*Primary Examiner* — Randy W Gibson
*Assistant Examiner* — Gedeon M Kidanu
(74) *Attorney, Agent, or Firm* — KPPB LLP

(57) ABSTRACT

Systems and methods of fabricating and functionality patterned nanowire probes that are stable under fluid reservoir conditions and have imageable contrast are provided. Optical imaging and deconstruction methods and systems are also provided that are capable of determining the distribution of nanowires of a particular pattern to determine the mixing between or leakage from fluid reservoirs.

14 Claims, 13 Drawing Sheets

(51) Int. Cl.
*G01N 15/00* (2006.01)
*G01N 15/06* (2006.01)
*G01N 15/08* (2006.01)
*G01N 15/14* (2006.01)

(52) U.S. Cl.
CPC ......... *G01N 15/06* (2013.01); *G01N 15/1463* (2013.01); *G01N 15/08* (2013.01); *G01N 2015/0038* (2013.01); *G01N 2015/0693* (2013.01); *G01N 2015/1486* (2013.01)

(58) Field of Classification Search
CPC ....... G01N 15/1463; G01N 2015/0038; G01N 2015/0693; G01N 2015/1486; G01N 2021/6432; G01N 21/643; G01N 21/6489; G01N 21/65; G01N 21/78; G01N 33/24; G01N 33/241; G01N 33/28; G01V 9/007
See application file for complete search history.

(56) References Cited

U.S. PATENT DOCUMENTS

| | | | |
|---|---|---|---|
| 4,755,469 | A | 7/1988 | Goldish et al. |
| 5,378,508 | A | 1/1995 | Castro et al. |
| 5,609,907 | A | 3/1997 | Natan |
| 6,025,202 | A | 2/2000 | Natan |
| 6,149,868 | A | 11/2000 | Natan et al. |
| 6,242,264 | B1 | 6/2001 | Natan et al. |
| 6,514,767 | B1 | 2/2003 | Natan |
| 6,579,721 | B1 | 6/2003 | Natan et al. |
| 6,579,726 | B1 | 6/2003 | Natan et al. |
| 6,624,886 | B2 | 9/2003 | Natan et al. |
| 6,861,263 | B2 | 3/2005 | Natan |
| 6,919,009 | B2 | 7/2005 | Stonas et al. |
| 7,045,049 | B1 | 5/2006 | Natan et al. |
| 7,192,778 | B2 | 3/2007 | Natan |
| 7,225,082 | B1 | 5/2007 | Natan et al. |
| 7,443,489 | B2 | 10/2008 | Natan |
| 7,723,100 | B2 | 5/2010 | Natan et al. |
| 7,947,211 | B2 | 5/2011 | Natan |
| 8,409,863 | B2 | 4/2013 | Natan et al. |
| 8,497,131 | B2 | 7/2013 | Natan et al. |
| 8,574,916 | B2 | 11/2013 | Natan et al. |
| 8,596,354 | B2 | 12/2013 | Hartshorne et al. |
| 8,828,729 | B1 | 9/2014 | Natan et al. |
| 8,918,161 | B2 | 12/2014 | Natan et al. |
| 8,988,679 | B2 | 3/2015 | Natan |
| 9,201,013 | B2 | 12/2015 | Natan |
| 9,207,234 | B2 | 12/2015 | Piotti et al. |
| 9,239,327 | B2 | 1/2016 | Natan et al. |
| 9,261,403 | B2 | 2/2016 | Walton et al. |
| 9,297,766 | B2 | 3/2016 | Natan |
| 9,726,609 | B2 | 8/2017 | Natan et al. |
| 2001/0029752 | A1 | 10/2001 | Natan et al. |
| 2002/0034827 | A1 | 3/2002 | Singh et al. |
| 2002/0104762 | A1 | 8/2002 | Stonas et al. |
| 2002/0142480 | A1 | 10/2002 | Natan |
| 2002/0146745 | A1 | 10/2002 | Natan et al. |
| 2003/0029274 | A1 | 2/2003 | Natan et al. |
| 2003/0157732 | A1 | 8/2003 | Baker et al. |
| 2003/0166297 | A1 | 9/2003 | Natan |
| 2003/0209427 | A1 | 11/2003 | Natan et al. |
| 2004/0178076 | A1 | 9/2004 | Stonas et al. |
| 2004/0209376 | A1 | 10/2004 | Natan et al. |
| 2005/0019556 | A1 | 1/2005 | Freeman et al. |
| 2005/0032226 | A1 | 2/2005 | Natan |
| 2005/0158870 | A1 | 7/2005 | Natan |
| 2005/0208663 | A1 | 9/2005 | Natan |
| 2005/0208665 | A1 | 9/2005 | Natan |
| 2005/0217424 | A1 | 10/2005 | Natan |
| 2005/0219509 | A1 | 10/2005 | Natan |
| 2005/0221494 | A1 | 10/2005 | Natan |
| 2005/0272160 | A1 | 12/2005 | Natan |
| 2006/0038979 | A1 | 2/2006 | Natan et al. |
| 2006/0054506 | A1 | 3/2006 | Natan et al. |
| 2007/0165209 | A1 | 7/2007 | Natan et al. |
| 2007/0165219 | A1 | 7/2007 | Natan et al. |
| 2007/0259437 | A1 | 11/2007 | Natan et al. |
| 2008/0096019 | A1 | 4/2008 | Natan |
| 2008/0224123 | A1* | 9/2008 | Martin ...................... B82B 3/00 257/23 |
| 2009/0025470 | A1* | 1/2009 | Green ................. E21B 47/1015 73/152.18 |
| 2009/0121193 | A1 | 5/2009 | Natan |
| 2009/0155811 | A1 | 6/2009 | Natan et al. |
| 2009/0298197 | A1* | 12/2009 | Natan ................. C12Q 1/6818 436/501 |
| 2010/0177306 | A1 | 7/2010 | Natan |
| 2010/0233816 | A1 | 9/2010 | Natan et al. |
| 2011/0059017 | A1 | 3/2011 | Natan et al. |
| 2011/0172523 | A1 | 7/2011 | Natan et al. |
| 2011/0195836 | A1 | 8/2011 | Natan |
| 2011/0207231 | A1 | 8/2011 | Natan et al. |
| 2011/0236260 | A1* | 9/2011 | Kim ........................ B82Y 5/00 422/68.1 |
| 2011/0240287 | A1* | 10/2011 | Hartshorne ......... E21B 47/1015 166/250.12 |
| 2011/0242531 | A1 | 10/2011 | Natan |
| 2012/0057165 | A1 | 3/2012 | Natan et al. |
| 2012/0062886 | A1 | 3/2012 | Piotti et al. |
| 2012/0164624 | A1 | 6/2012 | Natan et al. |
| 2013/0009119 | A1 | 1/2013 | Natan et al. |
| 2013/0011851 | A1 | 1/2013 | Natan et al. |
| 2013/0028839 | A1 | 1/2013 | Natan et al. |
| 2013/0155402 | A1 | 6/2013 | Walton et al. |
| 2013/0177455 | A1* | 7/2013 | Kamen ............... G06F 19/3418 417/313 |
| 2013/0337569 | A1 | 12/2013 | Natan et al. |
| 2014/0249053 | A1* | 9/2014 | Robinson ................ G01N 21/65 506/9 |
| 2015/0024423 | A1 | 1/2015 | Natan |
| 2015/0160136 | A1 | 6/2015 | Natan et al. |
| 2015/0323465 | A1 | 11/2015 | Natan et al. |
| 2016/0077011 | A1 | 3/2016 | Natan |
| 2017/0096593 | A1 | 4/2017 | Step et al. |
| 2018/0021499 | A1 | 1/2018 | Natan et al. |
| 2018/0164308 | A1 | 6/2018 | Walter et al. |
| 2019/0187040 | A1 | 6/2019 | Weiss et al. |

FOREIGN PATENT DOCUMENTS

| | | |
|---|---|---|
| WO | 2013062640 A1 | 5/2013 |
| WO | 2015171561 A1 | 11/2015 |

OTHER PUBLICATIONS

International Search Report and Written Opinion for International Application PCT/US2015/029173, Report Completed Aug. 17, 2015, dated Aug. 19, 2015, 11 Pgs.

Alaskar et al., "In-Situ Multifunction Nanosensors for Fractured Reservoir Characterization", GRC Transactions, vol. 34, 2010, 12 pgs.

Anderson, "A Rayleigh-Chebyshev procedure for finding the smallest eigenvalues and associated eigenvectors of large sparse Hermitian matrices", Journal of Computational Physics, vol. 229, Issue 19, Sep. 20, 2010, pp. 7477-7487, https://doi.org/10.1016/j.jcp.2010.06.030.

Dobrosotskaya et al., "A Wavelet-Laplace Variational Technique for Image Deconvolution and Inpainting", IEEE Transactions on Image Processing, vol. 17, Issue 5, May 2008, pp. 657-663, DOI: 10.1109/TIP.2008.919367.

Garcia-Cardona et al., "Multiclass Data Segmentation Using Diffuse Interface Methods on Graphs", IEEE Transactions on Pattern Analysis and Machine Intelligence, vol. 36, Issue 8, Aug. 2014, pp. 1600-1613, DOI: 10.1109/TPAMI.2014.2300478.

Gilboa et al., "Nonlocal Operators with Applications to Image Processing", Multiscale Modeling and Simulation, vol. 7, Issue 3, 2008, pp. 1005-1028, https://doi.org/10.1137/070698592.

(56) References Cited

OTHER PUBLICATIONS

Gilles et al., "Bregman implementation of Meyer's G-norm for cartoon + textures decomposition", UCLA CAM Report 11-73, Nov. 2011, 5 pages, retrieved from ftp://ftp.math.ucla.edu/pub/camreport/cam11-73.pdf.

Hsieh et al., "An Economical Micro-Car Testbed for Validation of Cooperative Control Strategies", Proceedings of the 2006 American Control Conference, Minneapolis, MN, Jun. 14-16, 2006, pp. 1446-1451, DOI: 10.1109/ACC.2006.1656421.

Hu et al., "A Method Based on Total Variation for Network Modularity Optimization Using the MBO Scheme", SIAM Journal on Applied Mathematics, vol. 73, Issue 6, 2013, pp. 2224-2246, https://doi.org/10.1137/130917387.

Lee et al., "Roll-to-Roll Anodization and Etching of Aluminum Foils for High-Throughput Surface Nanotexturing", Nano Letters, 2011, Published Online Jul. 20, 2011, vol. 11, No. 8, pp. 3425-3430, DOI: 10.1021/nl201862d.

Liao et al., "Small-Molecule Arrays for Sorting G-Protein-Coupled Receptors", The Journal of Physical Chemistry C, May 20, 2013, vol. 117, Issue 43, pp. 22362-22368, DOI: 10.1021/jp402921y.

Love et al., "Self-Assembled Monolayers of Thiolates on Metals as a Form of Nanotechnology", Chemical Reviews, Mar. 25, 2005, vol. 105, No. 4, pp. 1103-1169, DOI: 10.1021/cr0300789.

Martin, "Nanomaterials: A Membrane-Based Synthetic Approach", Science, Dec. 23, 1994, vol. 266, Issue 5193, pp. 1961-1966, DOI: 10.1126/science.266.5193.1961.

Nicewarner-Pena et al., "Submicrometer Metallic Barcodes", Science, 2011, vol. 294, No. 5540, pp. 137-141, DOI: 10.1126/science.294.5540.137.

Routkevitch et al., "Electrochemical Fabrication of CdS Nanowire Arrays in Porous Anodic Aluminum Oxide Templates", The Journal of Physical Chemistry, Aug. 15, 1996, vol. 100, Issue 33, pp. 14037-14047, DOI: 10.1021/jp952910m.

Rudin et al., "Nonlinear total variation based noise removal algorithms", Physica D: Nonlinear Phenomena, vol. 60, Issues 1-4, Nov. 1, 1992, pp. 259-268, https://doi.org/10.1016/0167-2789(92)90242-F.

Smith et al., "Patterning self-assembled monolayers", Progress in Surface Science, vol. 75, Issues 1-2, Jun. 2004, pp. 1-68, https://doi.org/10.1016/j.progsurf.2003.12.001.

Vese et al, "Modeling Textures with Total Variation Minimization and Oscillating Patterns in Image Processing", Journal of Scientific Computing, Dec. 2003, vol. 19, Issue 1-3, pp. 553-572, DOI: https://doi.org/10.1023/A:1025384832106.

* cited by examiner

DETERMINING FLUID RESERVOIR CONNECTIVITY USING NANOWIRE PROBES

CROSS-REFERENCE TO RELATED APPLICATIONS

The present application is a national stage of Application No. PCT/US2015/029173, filed May 5, 2015, which application claims priority to U.S. Provisional Application No. 61/988,808, filed May 5, 2014, the disclosures of which are hereby incorporated by reference in their entirety.

FIELD OF THE INVENTION

The present disclosure is directed to methods and systems for monitoring and testing underground fluid reservoirs; and more particularly to methods and systems for monitoring and testing underground wells and tanks using imageable nanowires.

BACKGROUND

An underground reservoir is an underground cavity, formation or tank that contains a fluid medium. A common example of such a reservoir is a well, which is a boring into the Earth that is designed to bring up a substance, such as water or petroleum oil hydrocarbons to the surface. In fields of such underground reservoirs, it can be important to know whether two reservoirs are fluidly interconnected. In other circumstances it is important to know if a container is leaking into its surroundings. Such connectivity can be difficult to determine, and so a need exists to develop systems and methods that enable the determination of the connectivity between any of a plurality of wells.

BRIEF SUMMARY

The present disclosure provides embodiments directed to systems and methods for detecting underground connections between or leakage from reservoirs via distinctly patterned functionalized nanowires or microwires that are stable under the conditions often encountered in underground reservoirs such as oil and gas wells, using imaging methods and algorithms to automate the determination of statistically significant numbers of differently encoded imaging patterns.

In some embodiments, the disclosure is directed to a method of determining flow from a reservoir including:
  providing at least one probe population formed of a plurality of nanowires, the population of nanowires having a distinct imageable pattern associated therewith, the distinct imageable pattern associated with the population being formed on each of the plurality of nanowires of said population;
  introducing the at least one population of a plurality of nanowires into a fluid medium in at least one fluid reservoir such that a mixture of nanowires and fluid medium is formed within the at least one fluid reservoir;
  sampling the mixture within the at least one fluid reservoir;
  imaging the mixture sample from the at least one fluid reservoir; and
  processing the imaged mixture samples to quantitatively determine the concentration of the at least one probe population disposed within the mixture samples.

In other embodiments the method includes:
  providing at least two probe populations each formed of a plurality of nanowires, each population of nanowires having a distinct imageable pattern associated therewith, the distinct imageable pattern associated with the population being formed on each of the plurality of nanowires of said population;
  introducing the at least two different populations of a plurality of nanowires separately into a fluid medium in each of a plurality of fluid reservoirs such that a mixture of nanowires and fluid medium is formed within each of the plurality of fluid reservoirs;
  sampling the mixture within each of the plurality of fluid reservoirs;
  imaging the mixture samples from each of the plurality of fluid reservoirs; and
  processing the imaged mixture samples to quantitatively determine the concentration of each of the at least two probe populations disposed within the mixture samples.

In still other embodiments the plurality of nanowires in each population are formed of at least two sizes.

In yet other embodiments the nanowires are comprised of a plurality of segments disposed adjacent each other along the longitudinal axis of the nanowire. In some such embodiments at least two of the segments are formed from different materials having an imageable contrast therebetween, the imageable contrast between the different segments forming the imageable pattern.

In still yet other embodiments the segments are formed of metals selected from the group consisting of Ag, Au, Cu, Pt and Pd.

In still yet other embodiments the outer surface of each of the nanowires is functionalized with a plurality of functional groups configured to prevent agglomeration of the nanowires.

In still yet other embodiments the functional group is a thiolate. In some such embodiments the plurality of functional groups do not obscure the imageable pattern.

In still yet other embodiments an encapsulation layer is disposed on the outer surface of each of the nanowires. In some such embodiments the encapsulation layer is a refractory oxide. In other such embodiments the encapsulation layer is functionalized with a plurality of functional groups configured to prevent agglomeration of the nanowires. In still other such embodiments the functional group is a hydrophobic siloxane. In yet other such embodiments the encapsulation layer and the plurality of functional groups do not obscure the imageable pattern.

In still yet other embodiments the imageable pattern is optically imageable and wherein the imaging comprises a video imagery technique selected from the group consisting of computer vision and wavelet-based image processing.

In still yet other embodiments the processing comprises automatically sorting the images from the sample by a processing technique selected from the group consisting of wavelet Gizburg-Landau regularization, spectral analysis of large Hermitian matrices, and modularity optimization.

In still yet other embodiments the method further includes deconstructing and or reconstructing the imaged mixture sample using an image processing technique selected from the group consisting of total variation (TV) restoration, cartoon texture decomposition, and nonlocal TV reconstruction.

In still yet other embodiments the sampling and imaging occurs within the flow from the at least one fluid reservoir.

In other embodiments, the disclosure is directed to a nanowire probe system including:

at least one probe population formed of a plurality of nanowires, the population of nanowires having a distinct imageable pattern associated therewith, the distinct imageable pattern associated with the population being formed on each of the plurality of nanowires of said population; and wherein the nanowires are comprised of a plurality of segments disposed adjacent each other along the longitudinal axis of the nanowire, the plurality of segments being formed from different materials having an imageable contrast therebetween, the imageable contrast between the different segments forming the imageable pattern.

In other embodiments the nanowire probe system includes at least two probe populations each formed of a plurality of nanowires, each population of nanowires having a distinct imageable pattern associated therewith, the distinct imageable pattern associated with the population being formed on each of the plurality of nanowires of said population.

In still other embodiments the plurality of nanowires in each population are formed of at least two sizes. In some such embodiments the segments are formed of metals.

In yet other embodiments the outer surface of each of the nanowires is functionalized with a plurality of functional groups configured to prevent agglomeration of the nanowires. In some such embodiments the plurality of functional groups does not obscure the imageable pattern.

In still yet other embodiments an encapsulation layer is disposed on the outer surface of each of the nanowires, and wherein the encapsulation layer is functionalized with a plurality of functional groups configured to prevent agglomeration of the nanowires. In some such embodiments the plurality of functional groups and the encapsulation layer do not obscure the imageable pattern.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

The present disclosure may be understood by reference to the following detailed description, taken in conjunction with the drawings as described below. It is noted that, for purposes of illustrative clarity, certain elements in various drawings may not be drawn to scale.

In accordance with the provided disclosure and drawings, systems and methods of fabricating and functionalizing patterned nanowires that are stable under underground reservoir conditions, have imageable contrast, and in some embodiments have sufficiently similar surface chemistry so that uniform or serial functionalization can be used are provided. Along with these nanowires, optical imaging methods and systems are provided capable of determining the distribution of nanowires having different patterns to determine the mixing between or leakage from fluid reservoirs.

The problem of tracing flowing reservoirs, and particularly in underground reservoirs where access is limited has long been a problem and a number of solutions have been proposed. (See, e.g., U.S. Pat. No. 4,755,469 or WO2011084656A1, the disclosures of which are incorporated herein by reference.) Most conventional systems for studying flow into and out of underground formations require the use of radioisotopes. (See, e.g., U.S. Pat. No. 507,771) While these systems can be successfully implemented, they typically require the use of very sophisticated detection schemes such as laser spectroscopy, mass spectrometry or electrochemical cells. (See, e.g., WO2007/102023 or U.S. Pat. No. 8,596,354) Many such solutions even propose systems in which samples would be sent to a laboratory for analysis. (See, e.g., Alaskar et al., *GRC Transactions*, vol. 34 (2010)) So far no system for reservoir flow monitoring has been proposed that would allow for the automated determination of the statistical populations of various probes in real time.

In many embodiments, methods are provided for the monitoring of the flow between two or more reservoirs in real-time. A schematic according to embodiments of such a system is provided in FIG. 1a. In embodiments, at least two batches of probes (12 & 12') formed of nanowires having different high-contrast optically identifiable patterns are loaded into at least two underground wells (14 & 14') such that the probes are introduced into the underground reservoirs (16 & 16') to which the wells are fluidly interconnected. Once the probes are introduced into the reservoirs, the wells are sampled at suitable intervals over a period of time and the samples analyzed using an automated optical monitoring device (18). The data thus supplied by the monitoring device provide information about the relative concentration of the various probes in each of the sampled wells and can be used to quantify the extent of mixing or flow between the wells.

Figure 1A:
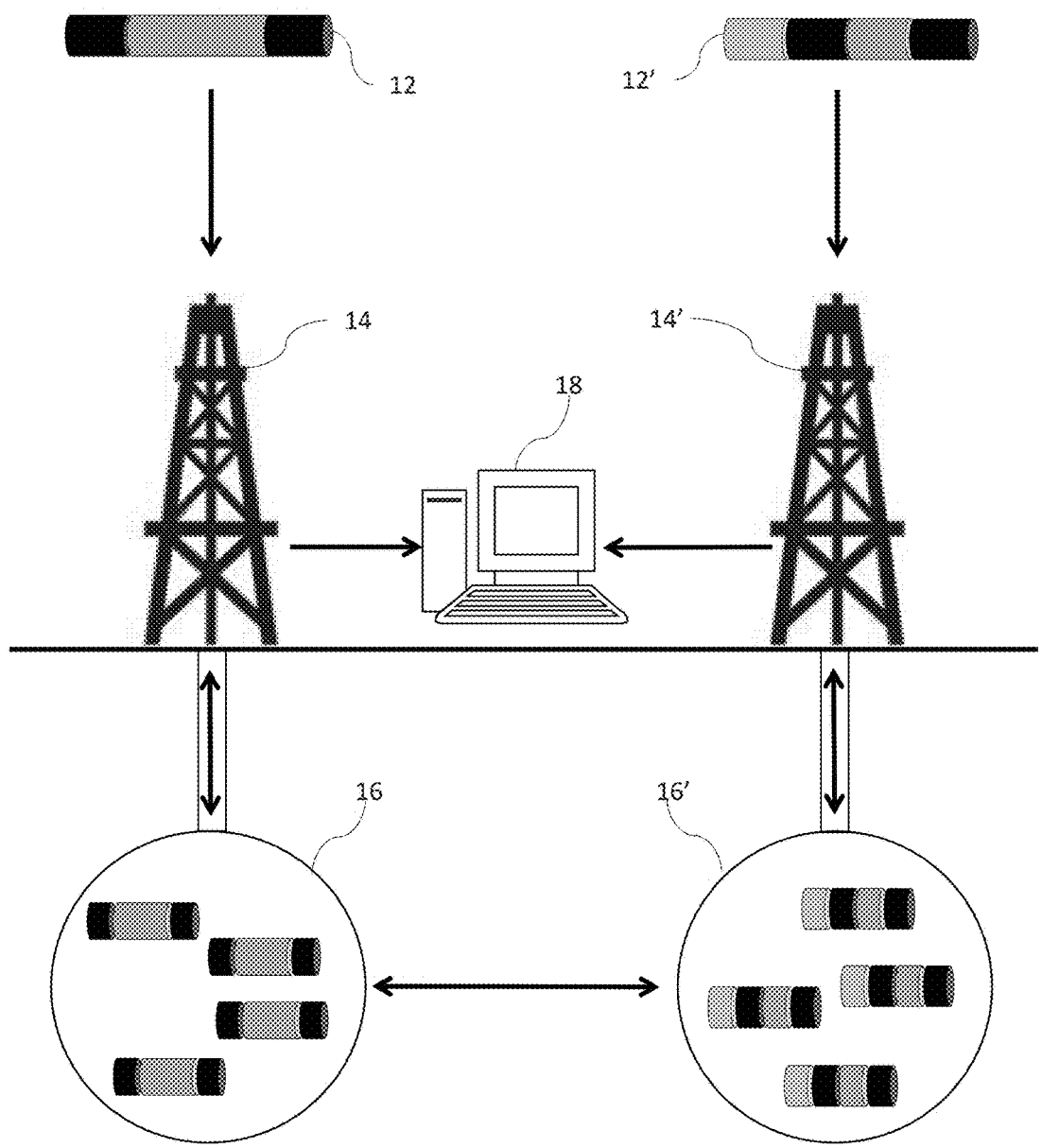
FIG. 1a provides a schematic of a method of detecting underground connections between fluid reservoirs in accordance with embodiments of the invention.
Figure 1B:
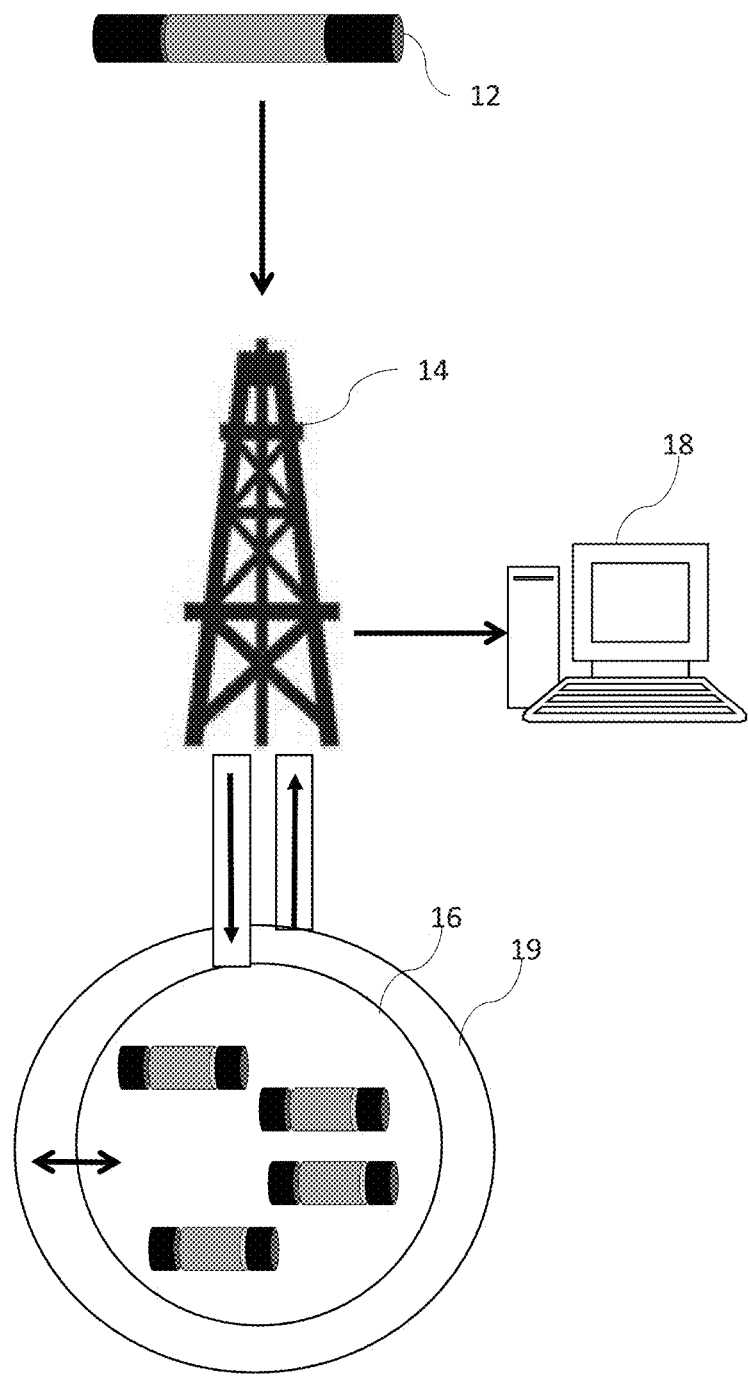
FIG. 1b provides a schematic of a method of detecting leakage from a fluid reservoir in accordance with embodiments of the invention.

Although the example schematic provided in FIG. 1a shows the use of the embodiments on two wells or underground reservoirs it will be understood that the technique described above can be used with any number or type of fluid reservoirs where there is a desire to determine either interflow or mixing between said reservoirs or the leakage of those reservoir(s) into their surroundings. For example, FIG. 1b provides a schematic according to embodiments of such an alternative system. In embodiments, a single batch of probes (12) formed of nanowires having a high-contrast optically identifiable pattern are loaded into a single well (14) such that the probes are introduced into the underground reservoir (16) to which the well is fluidly interconnected. Once the probes are introduced into the reservoir, the area of interest (19), such as, a surrounding fluid body or flow is sampled at suitable intervals over a period of time and the samples analyzed using an automated optical monitoring device (18). The data thus supplied by the monitoring device provide information about the concentration of the probes in the area of interest and can be used to quantify the extent of flow from the reservoir.

Exemplary embodiments of suitable fluid reservoir types include, for example, oil wells, water tables, underground or above ground storage tanks, etc. The requirements for use of the present system include a fluid medium into which the probes may be introduced (e.g., oil, water, etc.), a fluid pathway to introduce the probes into the reservoirs (e.g., a well head, pumping station, etc.), and a fluid pathway for sampling the fluid medium in the reservoirs (e.g., a pumping station, fluid sampling path, etc.). It should be understood that the same fluid pathway may be used for introducing and sampling the fluid medium. In many embodiments the sampling and/or introduction fluid path may also comprise the fluid path utilized for extraction of the fluid medium of the reservoir being monitored. In addition, although in some embodiments the probes are sampled external to the well or reservoir, in other embodiments detectors could be permanently positioned in various locations within the reservoir or introduced within the reservoir to image the fluid medium in-situ.

Figure 2A:
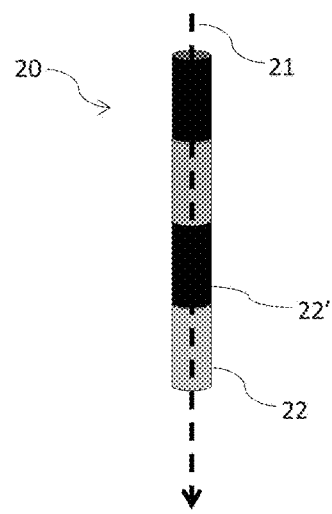
FIGS. 2a and 2b provide schematics of nanowire probes in accordance with embodiments of the invention.
Figure 2B:
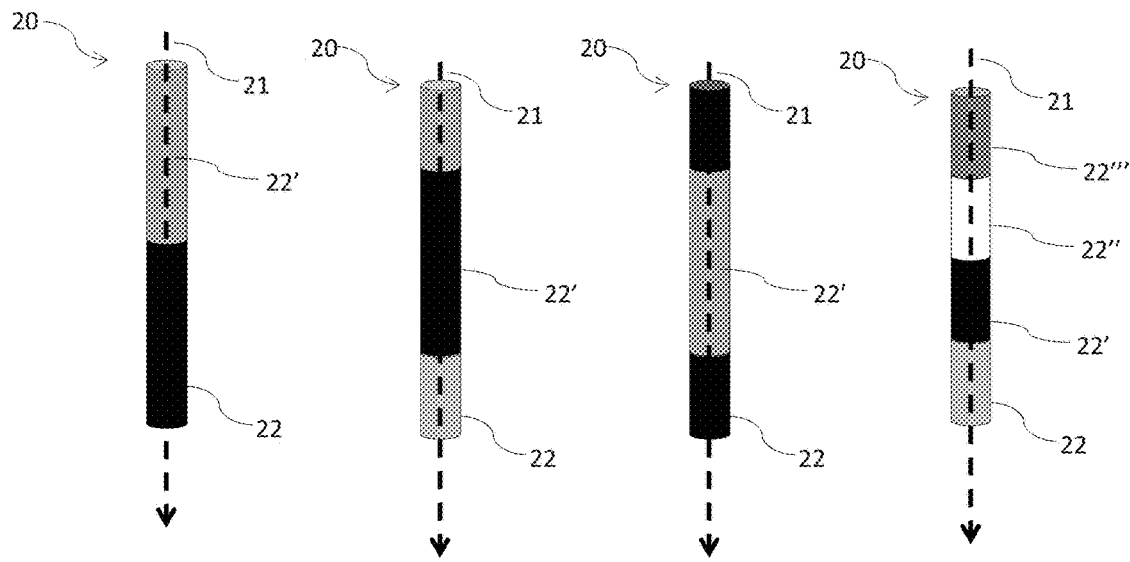

The probes according to embodiments comprise nanowires or microwires, formed with imageable patterns disposed thereon. In many embodiments, as shown schematically in FIG. 2a the nanowires (20) comprise a plurality of segments (22 & 22') of materials with contrasting imageable wavelengths formed along the longitudinal axis (21) of the nanowire. Although FIG. 2a show a schematic of one embodiment of such a nanowire, it will be understood that any number and arrangement of segments and materials may be used such that an imageable pattern of contrasting segments is formed in the nanowire. As shown in FIG. 2b this includes the use of different numbers segments, different segment lengths and segments of more than two materials of varying contrast.

The nanowires may be formed of any material suitable for use under the particular fluid reservoir conditions to be monitored. In many embodiments the materials for the nanowire probes are chosen with the following requirements in mind: 1) that the materials be relatively stable, i.e., not subject to material degradation, under the conditions found in the fluid reservoir; and 2) that the materials allow for the formation of features having an optical contrast suitable for monitoring via optical imaging sampling techniques. Exemplary materials may include two or more semiconductors, metals, oxides, ceramics, polymers, mixtures thereof, etc. In some such embodiments the probes are comprised of nanowires formed of alternating segments of two of more different metals that create an imageable contrast, such as, for example, Au, Cu, Ag, Pt, etc. The imageable contrast may be between any two imageable wavelengths, for example, between two visible wavelengths or between UV, IR or a combination of visible, IR and UV wavelengths. In many embodiments, the contrasting wavelengths of the segments are all in the visible spectrum such that optical scanning systems such as those similar to conventional barcode scanning systems may be used.

Although nanowire probes having identical diameters and lengths are shown in FIGS. 2a to 2b it should be understood that the diameters (FIG. 2c) and lengths (FIG. 2d) or both of the nanowires may also be varied such that the size of the pore or interconnections between the reservoirs may also be tested. The size (length and diameter) of the various probes may be chosen for the particular pore or interconnectivity size. With respect to the general dimensions of the nanowire/microwire probes, they may, in general take any suitable size so long as at least one dimension is between 1 nanometer and 100 microns.

Figure 3A:
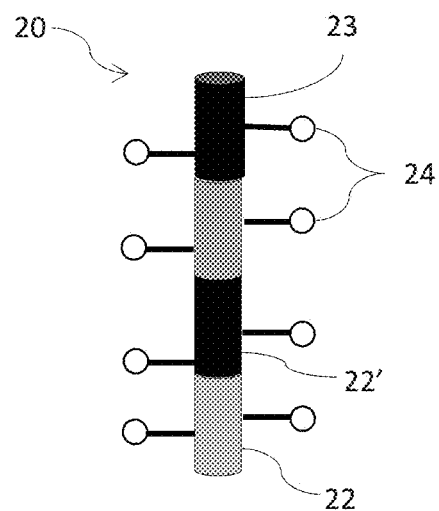
FIGS. 3a and 3b provide schematics of functionalized nanowire probes in accordance with embodiments of the invention.

In order to disperse the nanowire probes within the reservoir and particularly to prevent agglomeration of the probes after production, the outer surfaces of the nanowire probes may be further functionalized. In some embodiments, as shown in FIG. 3a, the outer surface (23) of the nanowire probes (20) may be functionalized with monolayers of functional groups (24), such as, for example, hydrophobic thiolates. (See, e.g., Love, et al., *Chem Rev*, 105 (2005)) In many embodiments where functionalization is desired the materials of the segments (22 & 22') may be selected such that a single functionalization chemistry will operate to functionalize all segments of the nanowire probes, although serial functionalization may also be used if a single uniform functionalization is unavailable.

Figure 3B:
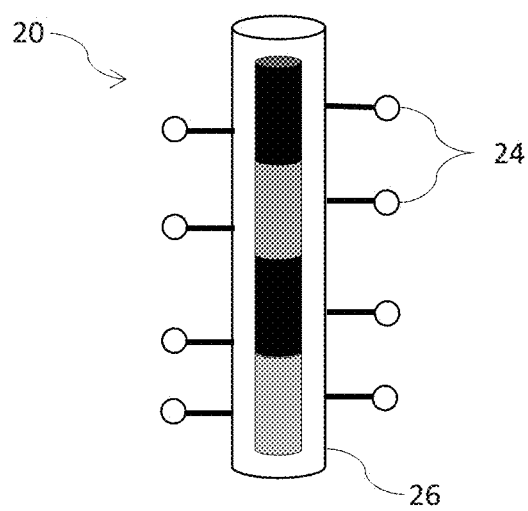

It should be understood that these functional groups do not have to survive in the reservoirs for the entire time that the probes are circulating within the reservoir so long as they survive at least during the initial introduction and dispersal of the probes into the reservoir. In other embodiments, where more robust functionalization is desired, as shown in FIG. 3b, an encapsulation layer (26) may be disposed about the nanowire probe (20) upon which the functional groups (24) may be further attached. For example, in some embodiments the encapsulation layer may comprise a refractory oxide, which may be further functionalized with a hydrophobic siloxane, for example. Functionalization through such an encapsulation layer allows for a more robust connection between functional group and probe and also allows for a single functional group substrate such that the segments of the nanowire probes may be formed with materials with disparate functional chemistries.

Regardless of the functional groups or encapsulation layers chosen to functionalize the probe nanowires, in many embodiments the materials are selected such that they are largely transparent, i.e., such that neither the functional nor encapsulation layers will interfere with the measurements of the imageable patterns formed on the probes.

Embodiments are also directed to methods of forming nanowire probes. In many embodiments, as shown schematically in FIG. 4a, an electrochemical method may be used. In such a method electrochemical etching is used to fabricate an inert membrane (30) with first (32) and second surfaces (34), and having one or more pores (37) with diameter and length dimensions that correspond with the diameter and length dimensions of the desired nanowire probes. These pores (37) serve as templates for controlled nanowire growth. In particular, it has been shown that the pore size diameter may be determined and controlled by the etching conditions used to form the membranes while the length of the individual nanowire probes may be controlled by the thickness of the original membrane block. The membrane block itself may be formed of any suitable inert material, such as, for example, alumina.

Figure 4A:
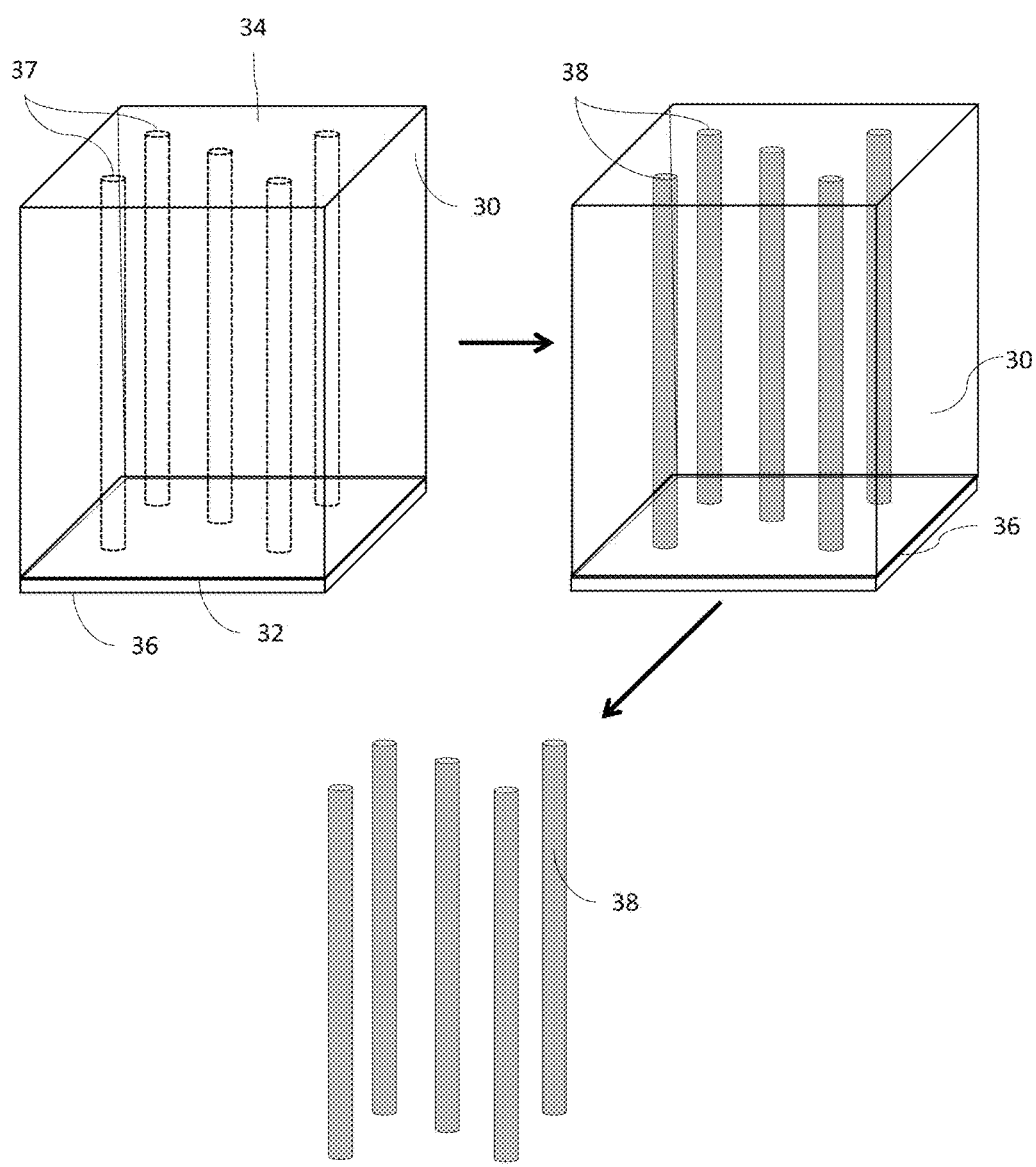
FIG. 4a provides a schematic of a process for forming nanowire probes in accordance with embodiments of the invention.
Figure 4B:
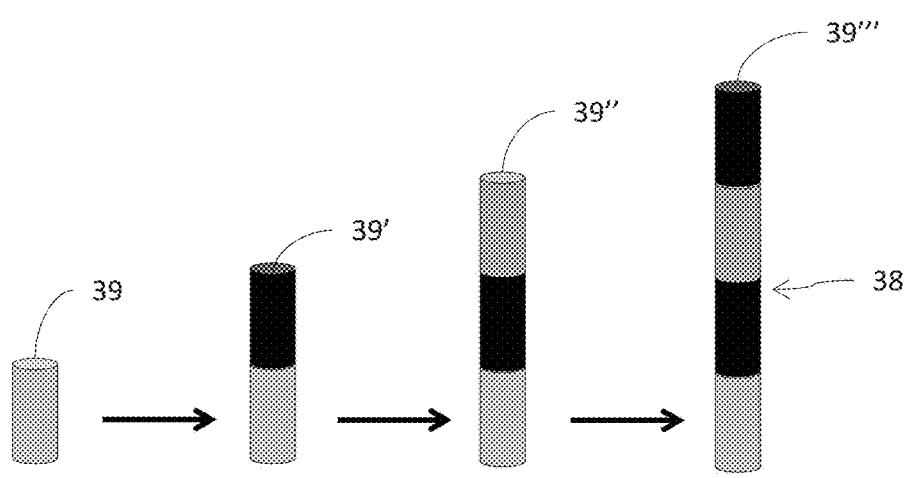
FIG. 4b provides a schematic of a process for forming a pattern on a nanowire in accordance with embodiments of the invention.

During fabrication, one side of the membrane is covered with a conductive layer (36), such as, for example a metallic paint such Ag, Au or Pt. The nanowires (38) are then grown within the pores (37) by use of electrochemical deposition. In particular, the nanowire probes grown in accordance with embodiments of the methods are formed with stripes of controlled length by reductive desorption from a solution containing a salt of the material, such as a metal, to be deposited. (See, e.g., C R Martin, Science 266, 1961 (1994); D Routkevitch et al., Journal of Physical Chemistry 100, 14037 (1996); and S R Nicewarner-Pena et al., Science 294, 5540 (2001).) In embodiments, the solutions and thus metals may be changed in order to grow segments (39 to 39''') of FIG. 4b) of different metals. In addition, in embodiments the integrated current at each step may be modified to alter the lengths of the different segments of the nanowire probe. Using a combination, therefore, of different solutions and different currents nanowires formed with different patterns of varying imageable contrast may be formed, as shown in FIG. 4b. After this controlled growth, as shown in FIG. 4a the membranes may then be dissolved to free the nanowires. If desired the nanowires may be further functionalized as described above and/or electron and optical microscopy may be further used for analysis and diagnostics of both the membranes and the nanowires.

In many embodiments, these systems and methods may be used to fabricate large numbers of nanowires. In particular, in some embodiments techniques for making membranes from large-area aluminum foil may be used to scale up production of the metal nanowires, as needed, and increased throughput may be tested by using flowing samples. (See, e.g., M H Lee, et al., Nano Letters 11, 3425 (2011); and W S Liao, et al., Journal of Physical Chemistry C 117, 22362 (2013).) These nanowires may be produced in populations of identical nanowires, where different batches may employ different imageable patterns to differentially "label" each of the reservoirs into which each population of nanowire probes are introduced.

Figure 5:
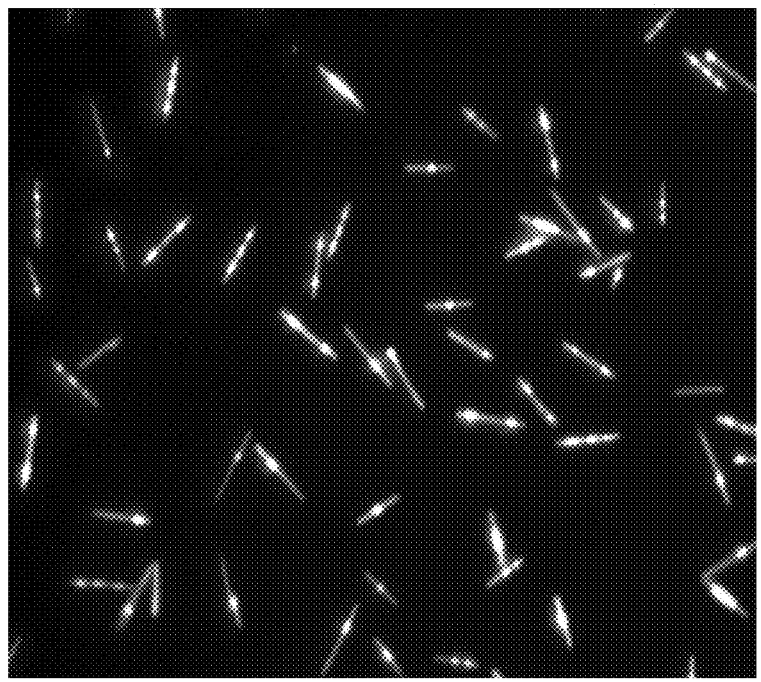
FIG. 5 provides an optical micrograph of exemplary striped metal nanowires in accordance with embodiments of the invention.

In embodiments, these systems may be used to produce nanowire probes formed, for example, with metal (such as, for example Au, Ag, Cu and Pt) semiconductor, polymer, or oxide striped nanowires that: 1) are stable under well conditions; 2) have a pattern with an imageable contrast; and 3) optionally either have sufficiently similar surface chemistry so that uniform or serial functionalization can be used or have an encapsulation layer that allows for such uniform or serial functionalization. An optical micrograph of a selection of different striped metal nanowires formed in accordance with such embodiments is provided as an example in FIG. 5.

Figure 6:
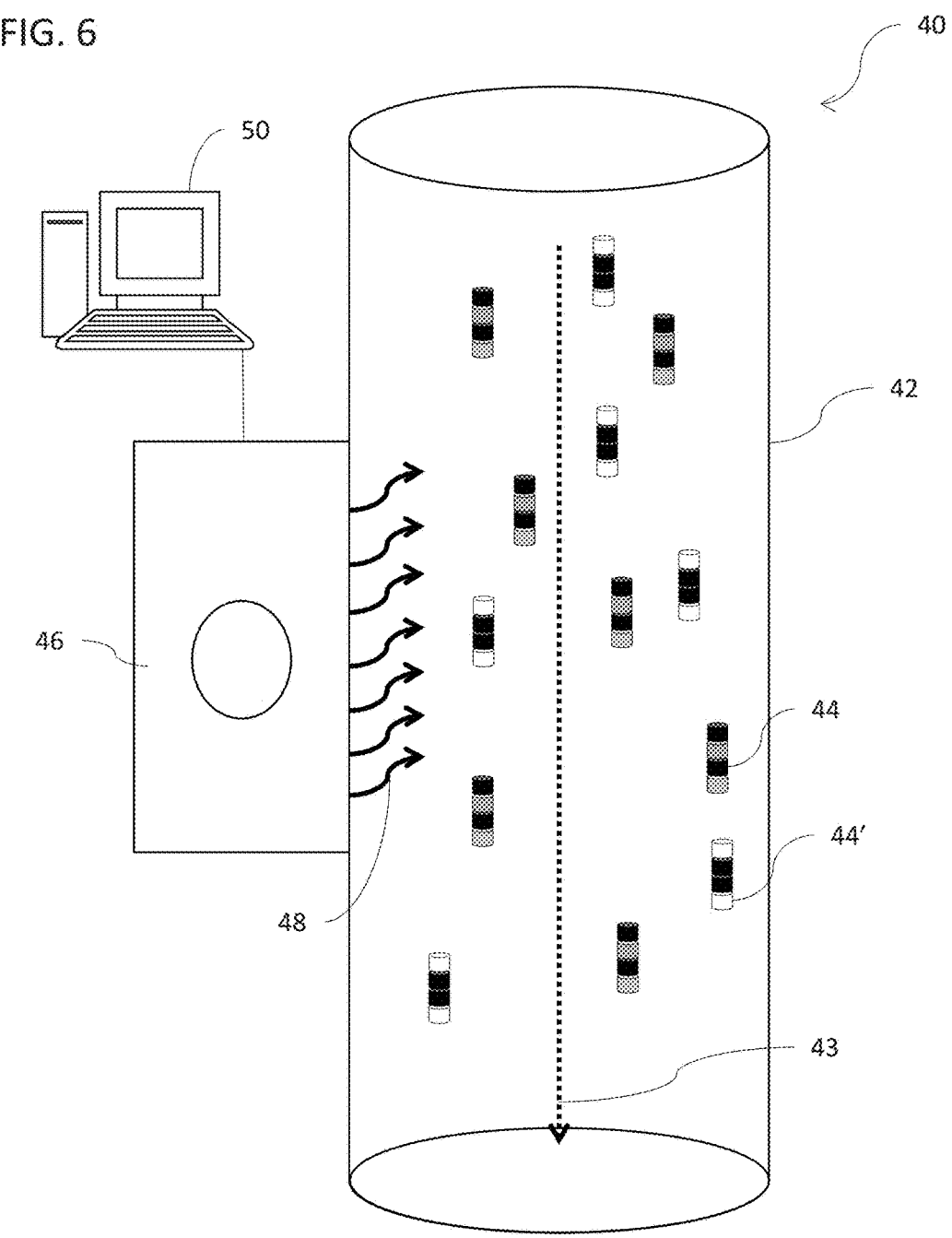
FIG. 6 provides a schematic of a process for imaging nanowire probe patterns in accordance with embodiments of the invention.

Embodiments are also directed to optical imaging of populations of nanowires having different imageable patterns. A schematic of such a system (40) is shown in FIG. 6 and generally comprises an optical imager (46) disposed in imaging relation to a sample chamber or flow region (42) fluidly interconnected with a sample reservoir. In the case of a flow region a flow (43) of a fluid from a sample reservoir may be directed therethrough. The optical imager (46) is designed to emit and detect an imaging emission (48). The imaging emission is selected to be of a wavelength suitable for detecting the imageable patterns disposed on at least one nanowire probe (44 and 44'). Using such imaging methods, and utilizing sampling methods, embodiments will be directed to systems adapted to determine the flow or mixing between or leakage from sampled reservoirs. In many embodiments, a signal processor (50) programmed with automated algorithms and methods may also be provided to automatically determine the statistical distribution of the nanowire probes of different imageable patterns within the sampling population. As discussed, embodiments may incorporate static distributions or flow distributions (as shown in FIG. 6) for higher throughput.

In many embodiments, automated tracking and identification systems and methods may be used to identify the different imageable patterns from the sample of nanowire probes. Embodiments of such systems and methods may be adapted from systems designed to automatically track and identify barcodes using video imagery. In some embodiments such systems may utilize Intel's or others' computer vision software (contour searching function that is capable of identifying rectangles that bound features in the image and an iterative algorithm that identifies symbols such as bar codes). In other embodiments, a wavelet-based image processing metric with several applications including one- and two-dimensional bar code deblurring may also be used. (See, e.g., J A Dobrosotskaya and A L Bertozzi, IEEE Transactions on Image Processing 17, 657 (2008).) Such embodiments may also include automatic sorting algorithms that take images as input and sort them into like categories.

Figure 2C:
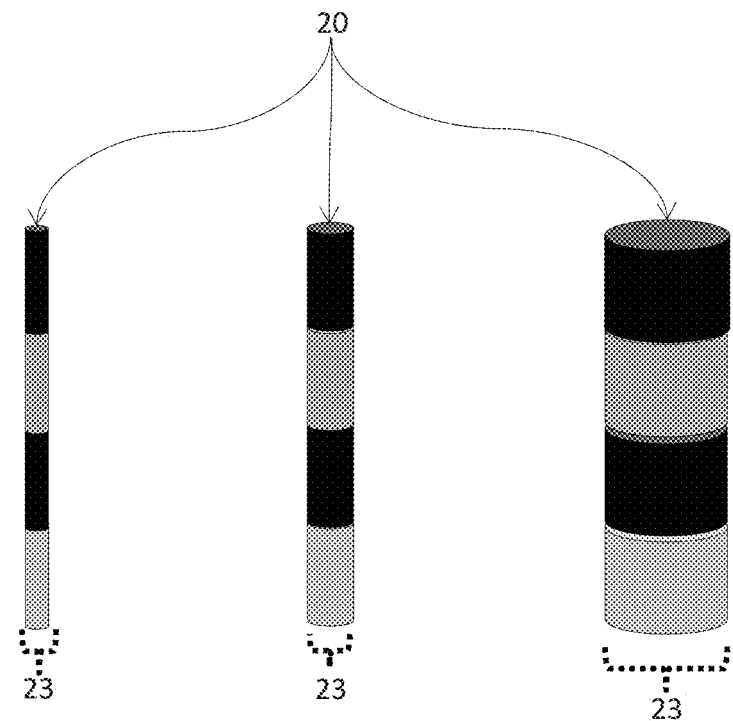
FIGS. 2c and 2d provide schematics of nanowire probes having different dimensional characteristics in accordance with embodiments of the invention.
Figure 2D:
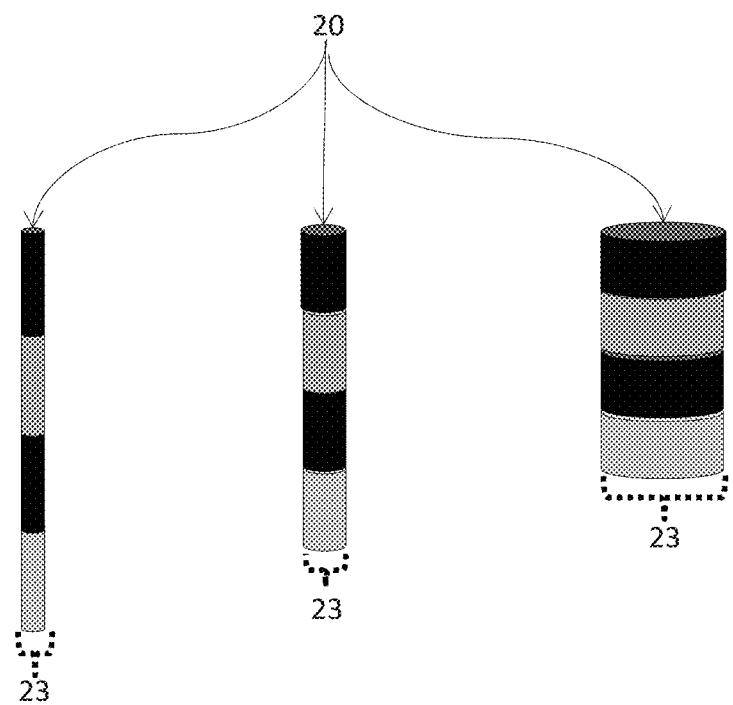
Figure 7A:
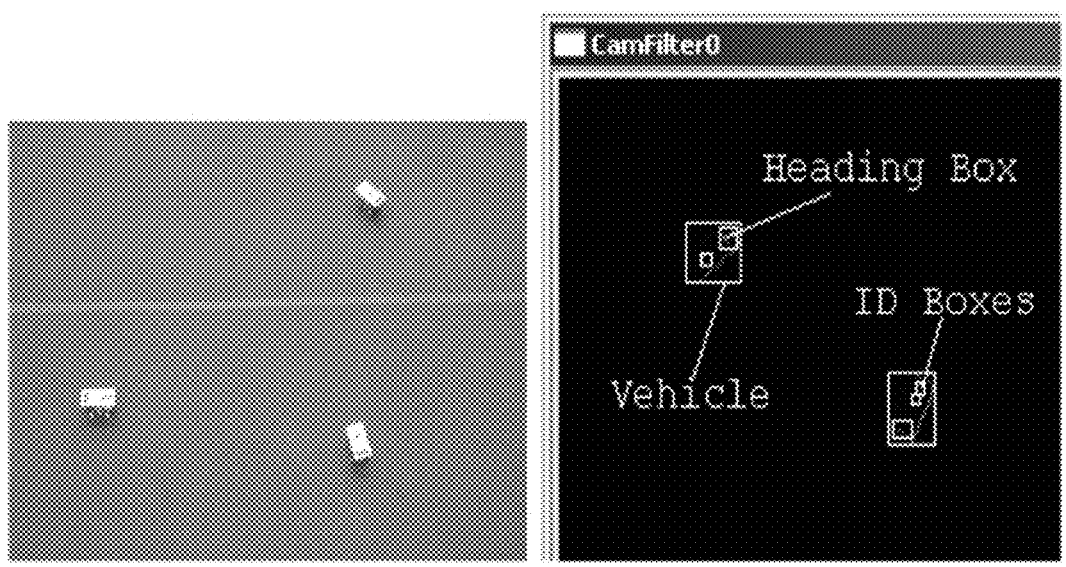
FIG. 7a provides real time tracking from 30-Hz video imagery using 2D bar codes in accordance with embodiments of the invention.
Figure 7B:
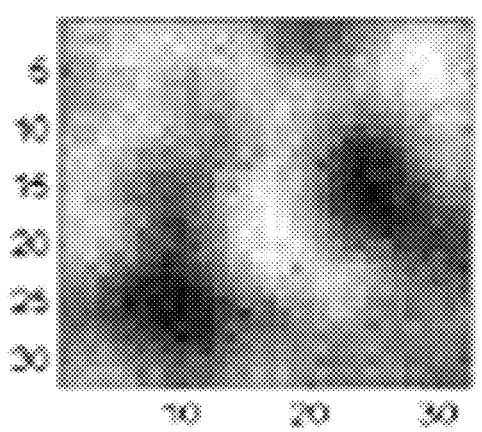
FIG. 7b provides results of bar code deconvolution using Wavelet Gizburg-Landau regularizer and the Haar basis in accordance with embodiments of the invention.
Figure 7B:
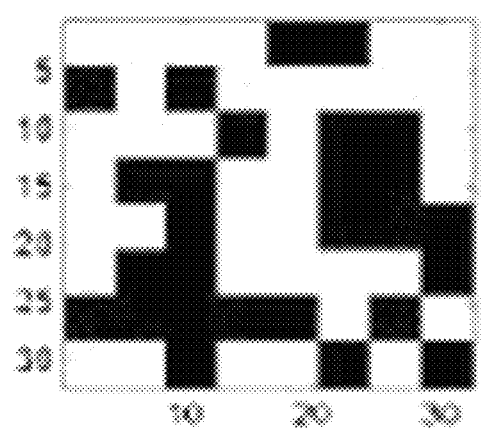
Figure 7C:
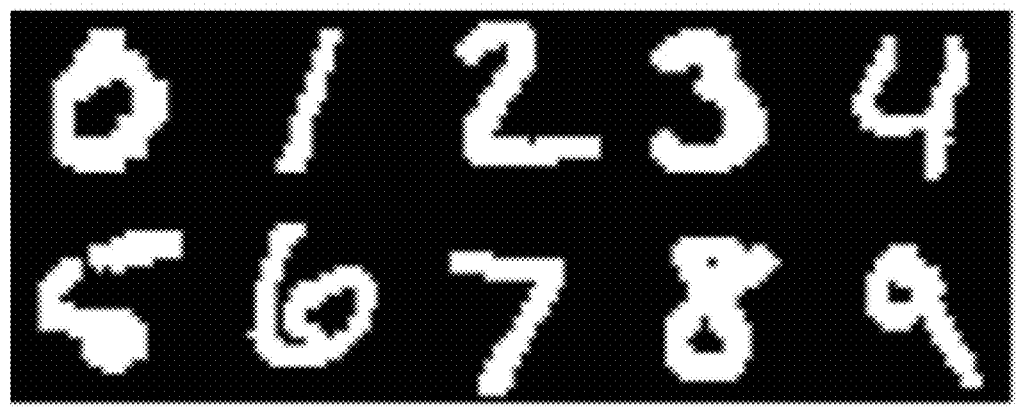
FIG. 7c provides images from the MNIST database of handwritten digits in accordance with embodiments of the invention.
Figure 8:
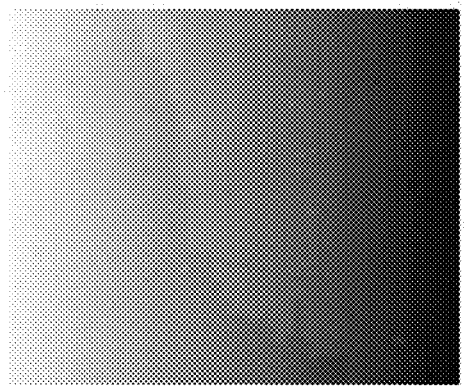
FIG. 8 provides raw scanning tunneling microscope image analyzed automatically to identify the positions and identities of every silicon and hydrogen atom present, with atomic resolution in accordance with embodiments of the invention.
Figure 8:
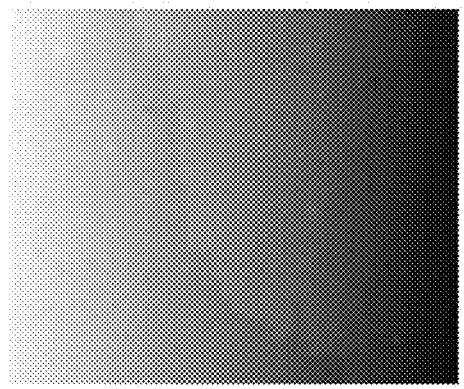
Figure 8:
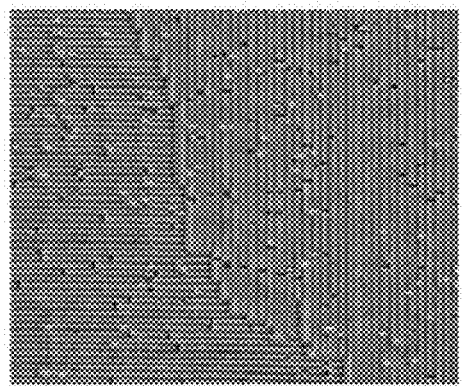

FIGS. 7a to 7c provide an example of such a system in operation, where FIG. 7a shows the real-time robotic tracking from 30-Hz video imagery using 2D bar codes to identify the robots. (C H Hsieh, et al., Proceedings of the 2006 American Control Conference, Minneapolis, Minn., June 14-16, pp 1446-1451). FIG. 2b shows a bar code deconvolution using Wavelet Gizburg-Landau regularizer and the Haar basis. (J A Dobrosotskaya and A L Bertozzi, cited above). Exemplary images from the MNIST database of handwritten digits, in which algorithms have been developed that are capable of automatically sorting images of handwriting with 98% accuracy, are shown in FIG. 2c. It has been shown that performance of these methods exhibits ~98% accuracy in both semi-supervised (with 3.6% training data) and completely unsupervised settings, either of which may be incorporated into embodiments of the systems and methods. The former runs efficiently and exploits recent advances in spectral analysis of large Hermitian matrices. (As described in C Garcia-Cardona, et al., IEEE Transactions on Pattern Analysis and Machine Intelligence (2014), in press. DOI: 10.1109/TPAMI.2014.2300478; and C R Anderson and A Rayleigh-Chebyshev, Journal of Computational Physics 229, 7477 (2010).) The latter exploits a method from social networking known as modularity optimization in which a problem is reformulated in terms of graph cuts. (See, e.g., H Hu, et al., SIAM Journal of Applied Mathematics 73, 2224 (2013).)

In addition to systems and methods of imaging the patterned nanowires, other embodiments are directed to the tracking, sorting, and identification of these cylindrical striped particles. In some such embodiments the nanowire images are reconstructed and important features extracted. In particular, state-of-the-art reconstruction as well as image decompositions may be incorporated into some embodiments to enhance the images of the striped metal nanorods. In many embodiments one or more of the following methodologies may be used: total variation restoration (L I Rudin, et al., Physica D 60, 259 (1992)); cartoon texture decomposition (L Vese and S Osher, Journal of Scientific Computation 19, 553 (2003); and J E Gilles and S Osher, UCLA CAM Report 11-73, (2011)); and nonlocal TV reconstruction (G Gilboa and S Osher, Multiscale Modeling and Simulation 7, 1005 (2008)). In particular, nonlocal TV reconstruction works well for supervised segmentation determination. In addition, a new cartoon texture decomposition has been developed that may be incorporated into embodiments. FIG. 3 shows the application of this technique to a noisy scanning tunneling microscopy image of silicon and hydrogen atoms. As is shown, the texture that is nearly invisible in the original image is resolved using the technique, thus yielding the positions and identities of individual silicon and hydrogen atoms.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween

What is claimed is:

1. A method of determining reservoir flow comprising:
introducing at least one probe population formed of a plurality of nanowires into a fluid medium in at least one fluid reservoir such that a mixture of nanowires and fluid medium is formed within the at least one fluid reservoir, the probe population having a distinct imageable pattern associated therewith, wherein the distinct imageable pattern associated with the population being formed on each of the plurality of nanowires of said population;
obtaining a sample of the mixture from at least one of the at least one fluid reservoir;
optically imaging the sample; and
processing the imaged sample using a signal processor to identify the at least one probe population disposed within the sample, wherein the identification of the at least one probe population indicates a flow from the at least one fluid reservoir, and wherein the signal processor is programmed with an automated algorithm and capable of differentiating the distinct imageable patterns associated with each population of nanowires.

2. The method of claim 1, comprising:
introducing at least two probe populations each formed of a plurality of nanowires into a plurality of fluid reservoirs,
wherein each of the at least two probe populations is introduced into a separate fluid reservoir in the plurality of fluid reservoirs such that a mixture of nanowires and fluid medium is formed within each fluid reservoir in the plurality of fluid reservoirs,
wherein each population of nanowires having a distinct imageable pattern associated therewith, the distinct imageable pattern associated with the population being formed on each of the plurality of nanowires of said population;
obtaining a sample of the mixture within each of the plurality of fluid reservoirs;
imaging the samples from each of the plurality of fluid reservoirs; and
processing the imaged samples using a signal processor to identify each of the at least two probe populations disposed within the samples, wherein the identification of each of the at least two probe populations indicates a flow from the fluid reservoir in which each of the at least two probe populations was introduced, and wherein the signal processor is programmed with an automated algorithm and capable of differentiating the distinct imageable patterns associated with each population of nanowires.

3. The method of claim 1, wherein the nanowires are comprised of a plurality of segments disposed adjacent each other along the longitudinal axis of the nanowire.

4. The method of claim 1, wherein the imageable pattern is optically imageable and wherein the imaging comprises a video imagery technique selected from the group consisting of computer vision and wavelet-based image processing.

5. The method of claim 1, wherein the processing comprises automatically sorting the images from the sample by a processing technique selected from the group consisting of wavelet Gizburg-Landau regularization, spectral analysis of large Hermitian matrices, and modularity optimization.

6. The method of claim 1, further comprising deconstructing and or reconstructing the imaged mixture sample using an image processing technique selected from the group consisting of total variation restoration, cartoon texture decomposition, and nonlocal TV reconstruction.

7. The method of claim 1, wherein the sampling and imaging occurs within the flow from the at least one fluid reservoir.

8. The method of claim 1, wherein the plurality of nanowires in each population are formed of at least two sizes.

9. The method of claim 8, wherein at least two of the segments are formed from different materials having an imageable contrast therebetween, the imageable contrast between the different segments forming the imageable pattern.

10. The method of claim 1, wherein the outer surface of each of the nanowires is functionalized with a plurality of functional groups configured to prevent agglomeration of the nanowires.

11. The method of claim 10, wherein the plurality of functional groups do not obscure the imageable pattern.

12. The method claim 1, wherein an encapsulation layer is disposed on the outer surface of each of the nanowires.

13. The method of claim 12, wherein the encapsulation layer is functionalized with a plurality of functional groups configured to prevent agglomeration of the nanowires.

14. The method of claim 13, wherein the encapsulation layer and the plurality of functional groups do not obscure the imageable pattern.

\* \* \* \* \*